US006985828B2

(12) United States Patent
Itoh

(10) Patent No.: US 6,985,828 B2
(45) Date of Patent: Jan. 10, 2006

(54) LOADING-ASSISTING APPARATUS FOR USE WITH CENTRIFUGE

(76) Inventor: Teruaki Itoh, 5-25, Kokaihommachi, Kumamoto-shi, Kumamoto-ken (JP)

( * ) Notice: Subject to any disclaimer, the term of this patent is extended or adjusted under 35 U.S.C. 154(b) by 0 days.

(21) Appl. No.: 10/714,942

(22) Filed: Nov. 18, 2003

(65) Prior Publication Data

US 2004/0102920 A1 May 27, 2004

(30) Foreign Application Priority Data

Nov. 26, 2002 (JP) ....................................... 2002-342515

(51) Int. Cl.
*G06F 15/00* (2006.01)

(52) U.S. Cl. ......................... 702/173; 702/94; 702/101; 702/102; 702/129

(58) Field of Classification Search ................... 702/85, 702/74, 101, 102, 127, 128, 129, 173, 174, 702/175; 73/863.01
See application file for complete search history.

(56) References Cited

U.S. PATENT DOCUMENTS

| | | | | |
|---|---|---|---|---|
| 3,679,130 A | * | 7/1972 | Mayo et al. | 494/20 |
| 4,798,095 A | * | 1/1989 | Itoh | 73/863.01 |

FOREIGN PATENT DOCUMENTS

| | | |
|---|---|---|
| JP | 6-320052 | 11/1994 |
| JP | 7-308607 | 11/1995 |
| JP | 2002-273271 | 9/2002 |

* cited by examiner

*Primary Examiner*—Bryan Bui
(74) *Attorney, Agent, or Firm*—Nixon & Vanderhye P.C.

(57) ABSTRACT

A loading-assisting apparatus for use with a centrifuge is provided with a measuring device configured to measure the weight of each of the object processing groups, a detector device configured to detect a difference between the weight of each of the object processing groups and a corresponding reference value, and an adjusting/loading device configured to make predetermined weight adjustments to each of the processing groups in accordance with the difference, and to subsequently load the processing groups in the centrifuge.

7 Claims, 2 Drawing Sheets

LOADING-ASSISTING APPARATUS FOR USE WITH CENTRIFUGE

CROSS-REFERENCE TO RELATED APPLICATIONS

This application is based upon and claims the benefit of priority from the prior Japanese Patent Application No. 2002-342515, filed Nov. 26, 2002, the entire contents of which are incorporated herein by reference.

BACKGROUND OF THE INVENTION

1. Field of the Invention

The present invention relates to a loading-assisting apparatus which is designed for use with a centrifuge, and which is used to make a weight adjustment to samples (e.g., blood samples) to be processed when the samples are loaded in the centrifuge.

2. Description of the Related Art

When blood samples are subject to centrifugal separation, there are two ways for loading. In one way, sample vessels holding blood samples to be tested are individually loaded in the centrifuge. In the other way, the sample vessels holding blood samples to be tested are first arranged and held in a rack, and then this rack is loaded in the centrifuge. In either way, sample groups corresponding to the respective buckets of the rotor of the centrifuge must be balanced in weight. If they are not, the rotor of the centrifuge loses its weight balance as determined in the circumferential direction. As a result, the rotor of the centrifuge does not rotate smoothly.

Centrifuges that aim to prevent an imbalanced state of rotors have been proposed to date. For example, Jpn. Pat. Appln. KOKAI Publication No. 06-320052 discloses a centrifuge wherein an imbalance correction mechanism comprising a position-adjustable weight is provided on a rotation table (i.e., a rotor) at a position adjacent to a sample cassette. Jpn. Pat. Appln. KOKAI Publication No. 2002-273271 discloses a centrifuge using a dummy centrifugal tube having a substantially equivalent weight to that of a sample-holding centrifugal tube. The dummy centrifugal tube is provided for the rotor, as needed.

In the centrifuge disclosed in Jpn. Pat. Appln. KOKAI Publication No. 06-320052, the rotating table (rotor) has to be provided with the imbalance correction mechanism as well as sample cassettes. This inevitably complicates the structure of the centrifuge and increases the size of the centrifuge.

The centrifuge disclosed in Jpn. Pat. Appln. KOKAI Publication No. 2002-273271 has problems in that it requires a manual operation. To be more specific, the rotor of this centrifuge is rotated to check its rotating condition. In accordance with the checked rotating condition, the dummy centrifugal tube is manually replaced with another. Since adjustment made to balance the weight of the entire rotor takes time, smooth centrifugal processing cannot be expected.

BRIEF SUMMARY OF THE INVENTION

Accordingly, an object of the present invention is to provide a loading-assisting apparatus designed for use with a centrifuge, which has the following advantages:

a) Reliable rotation of the rotor is ensured with no need to complicate the centrifuge or increase its size.

b) Adjustment for balancing the weight of the entire rotor can be made quickly and reliably.

To achieve the above object, the present invention provides a loading-assisting apparatus which is designed for use with a centrifuge, and which has the features described below. Other features of the present invention will become apparent from the descriptions of embodiments given below.

The loading-assisting apparatus for use with a centrifuge, which embodies the present invention, comprises: a measuring device configured to measure the weight of each of sample groups loaded in the buckets of the centrifuge; a determination device configured to determine how the measured weight of each sample group differs from a reference value; and an adjustment/loading device configured to make weight adjustments to each sample group in accordance with results of determination the determination device makes, and to load each sample group.

DETAILED DESCRIPTION OF THE INVENTION (First Embodiment)

Figure 1:
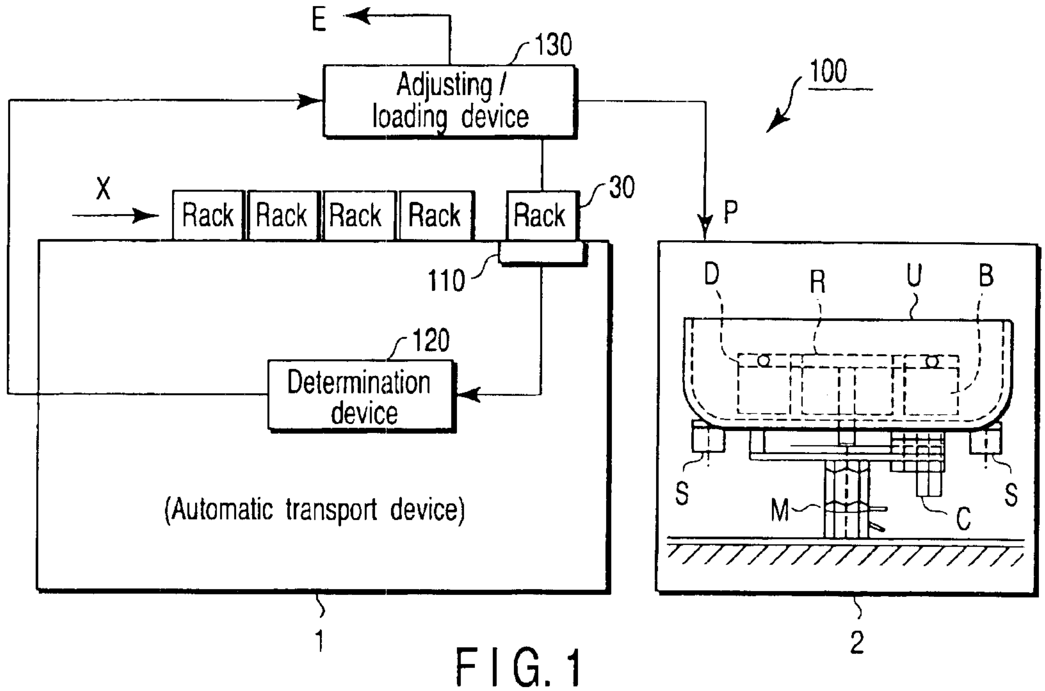
FIG. 1 is a schematic illustration of a loading-assisting apparatus for use with a centrifuge, according to the first embodiment of the present invention.

FIG. 1 shows a loading-assisting apparatus 100 for use with a centrifuge, according to the first embodiment of the present invention. This apparatus adjusts the weight variations of sample groups G (which are racks 30 holding sample vessels in the case of the first embodiment) transported in the direction of arrow X by an automatic transport device 1, before the sample groups G (racks 30) are loaded in a centrifuge 2.

The centrifuge 2 comprises: a motor M; a rotor R including a rotation disk D rotated by the motor M and buckets B swingably attached to the circumferential portions of the rotation disk D; a protection frame U that surrounds the rotor R; a rotation position sensor C which detects a rotation position of the rotor R; etc.

A measuring device 110 is located under the terminating end of the rack transport path of the automatic transport device 1. By this measuring device 110, the weights of the racks 30 holding sample vessels (i.e., the sample groups G to be processed by the centrifuge 2) are measured before the racks 30 are loaded in the centrifuge 2.

The automatic transport device 1 is provided with a determination device 120 configured to determine the weight variations of the racks 30 holding the sample vessels. Based on the weights of the racks 30 measured by the measuring device 110, the determination device 120 determines weight variations of the sample groups G loaded in each bucket B of the centrifuge 2.
The weight variations are determined using reference weight values.

An adjusting/loading device 130 is provided above the automatic transport device 1. based on the results of the determination the determination device 120 makes, the adjusting/loading device 130 weight adjustments to the racks 30 holding sample vessels. After this weight adjustment, the racks 30 holding sample vessels are loaded in the centrifuge 2, as indicated by arrow P.

Figure 2:
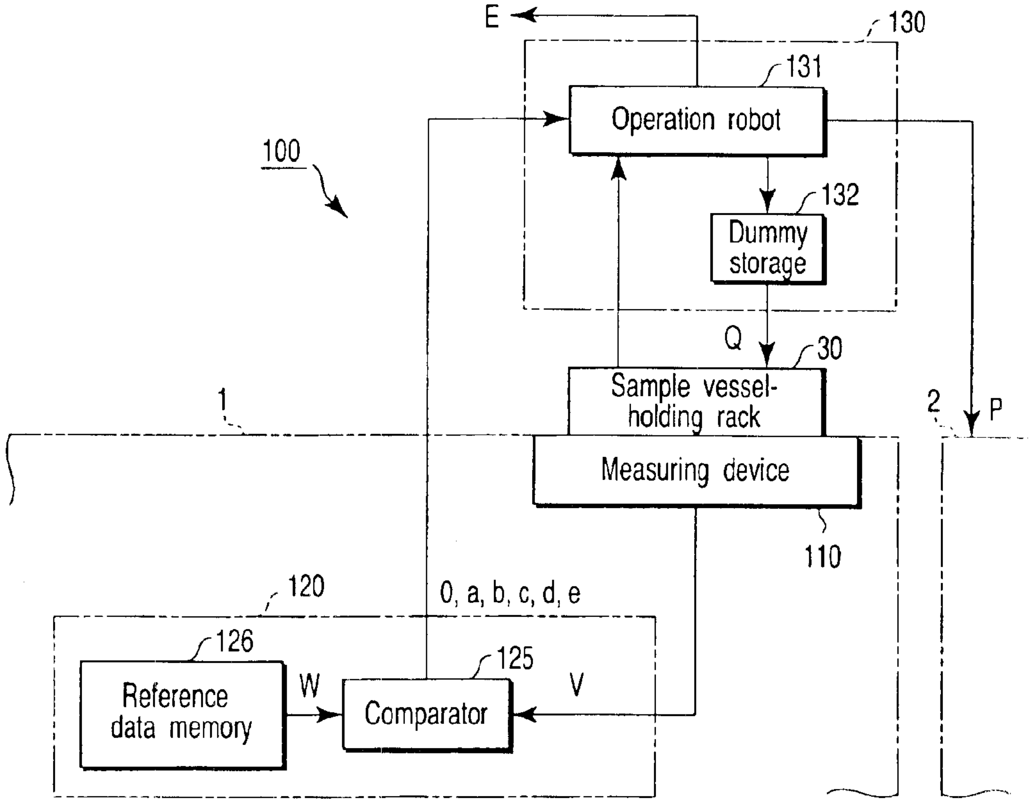
FIG. 2 is a block diagram showing the major portions of the loading-assisting apparatus of the first embodiment.

FIG. 2 is a block diagram showing the major portions of the loading-assisting apparatus of the first embodiment. As shown in FIG. 2, the determination device 120 includes a comparator 125 and a reference data memory 126. The comparator 125 compares signals supplied from the measuring device 110 (i.e., measurement data V representing the weights of the sample vessel-holding racks 30 which are groups G of samples to be processed) with weight reference data W stored in the reference data memory 126 and corresponding to the groups G of samples to be processed. Based on the comparison, the comparator 125 generates and outputs variation ranking signals 0, a, b, c, d and e.

Ranking signal 0 represents that the difference between measurement data V and reference data W is within an allowable variation range.

Ranking signal a represents that the difference between measurement data V and reference data W is less than variation S1.

Ranking signal b represents that the difference between measurement data V and reference data W is less than variation S2.

Ranking signal c represents that the difference between measurement data V and reference data W is less than variation S3.

Ranking signal d represents that the difference between measurement data V and reference data W is less than variation S4.

Ranking signal e represents that the difference between measurement data V and reference data W exceeds variation S4.

Variation S1 is determined beforehand. For example, it corresponds to the weight of one sample vessel or about one fifth to half of that weight.

As shown in FIG. 2, the adjusting/loading device 130 includes an operation robot 131 and a dummy storage 132. The operation robot 131 operates in accordance with variation ranking signals 0, a, b, c, d and e supplied from the determination device 120. The dummy storage 132 has shapes and dimensions similar to those of a sample vessel 3, and stores a plurality of dummy objects Q whose weights correspond to variations S1 to S4.

Upon receipt of variation ranking signal 0, the operation robot 131 loads the sample vessel-holding rack 30 into the centrifuge 2 as it is.

Upon receipt of variation ranking signal a, the operation robot 131 takes out a dummy object Q1 whose weight corresponds to variation S1 from the dummy storage 132, and adds it to the sample vessel-holding rack 30. Then, the operation robot 131 loads the sample vessel-holding rack 30 into the centrifuge 2, with the dummy object Q1 added thereto.

Upon receipt of variation ranking signal b, the operation robot 131 takes out a dummy object Q2 whose weight corresponds to variation S2 from the dummy storage 132, and adds it to the sample vessel-holding rack 30. Then, the operation robot 131 loads the sample vessel-holding rack 30 into the centrifuge 2, with the dummy object Q2 added thereto.

The operation robot 131 operates in similar manners when it receives variation ranking signals c, and d. In other words, the operation robot 131 receives variation ranking signals, adds dummy objects Q whose weights correspond to the variation ranking signals to the sample vessel-holding racks 30, and then loads the racks 30 to the centrifuge 2, with the objects Q added thereto.

Upon receipt of variation ranking signal e, the operation robot 131 regards the corresponding sample vessel-holding rack 30 as an abnormal rack, i.e., a rack whose weight cannot be adjusted. In this case, the operation robot 131 returns the abnormal rack to its original position, as indicated by arrow E, and simultaneously issues an abnormality notification signal.

(Second Embodiment)

Figure 3:
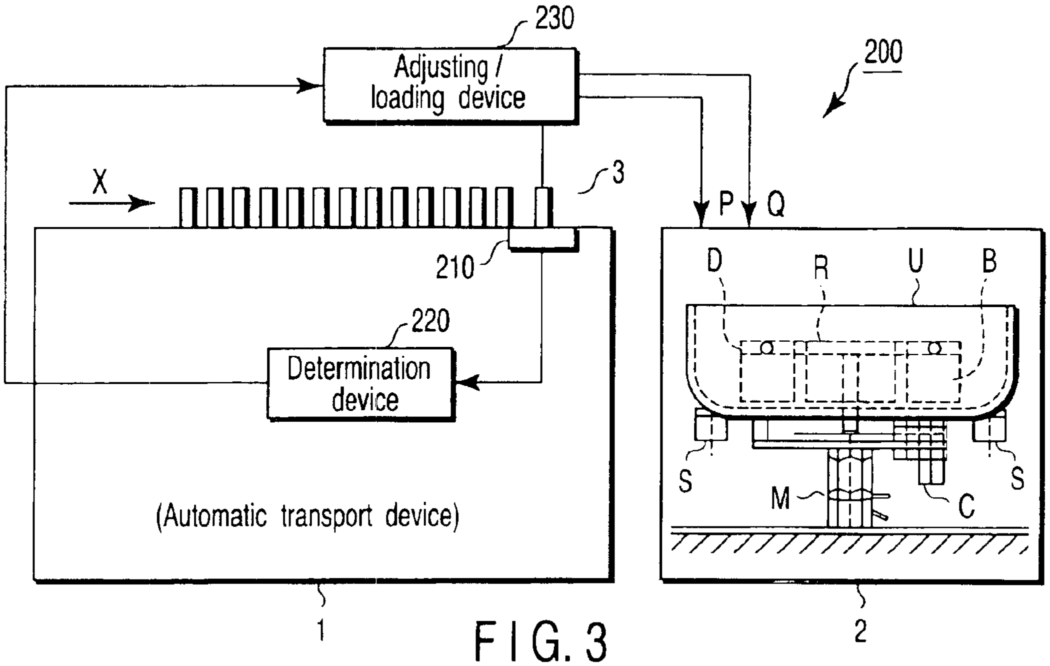
FIG. 3 is a schematic illustration of a loading-assisting apparatus for use with a centrifuge, according to the second embodiment of the present invention.

FIG. 3 shows a loading-assisting apparatus 200 for use with a centrifuge, according to the second embodiment of the present invention. This apparatus sequentially loads objects G to be processed (sample vessels 3 in the second embodiment), which are transported in the direction of arrow X by an automatic transport device 1, into the centrifuge 2. Simultaneous with this loading operation, the apparatus 200 makes weight adjustments to eliminate the adverse effects stemming from the weight variations of the sample vessels 3 (i.e., the objects to be processed).

A measuring device 210 is located under the terminating end of the rack transport path of the automatic transport device 1. By this measuring device 210, the weights of the sample vessels 3 to be processed by the centrifuge 2 are individually measured before the vessels 3 are loaded in the centrifuge 2.

The automatic transport device 1 is provided with a determination device 220 configured to determine the weight variations of the sample vessels 3. Based on the weights of the sample vessels 3 measured by the measuring device 210, the determination device 220 determines weight variations of the sample groups G to be loaded in the buckets B of the centrifuge 2. The weight variations are determined using reference weight values corresponding to the respective sample groups G.

An adjusting/loading device 230 is provided above the automatic transport device 1. The adjusting/loading device 230 is provided with means for sequentially loading the sample vessels 3 in the buckets B of the centrifuge 2 after the weight measurement by the measuring device 210, and means for making weight adjustment to the groups G already loaded in the buckets B.

Figure 4:
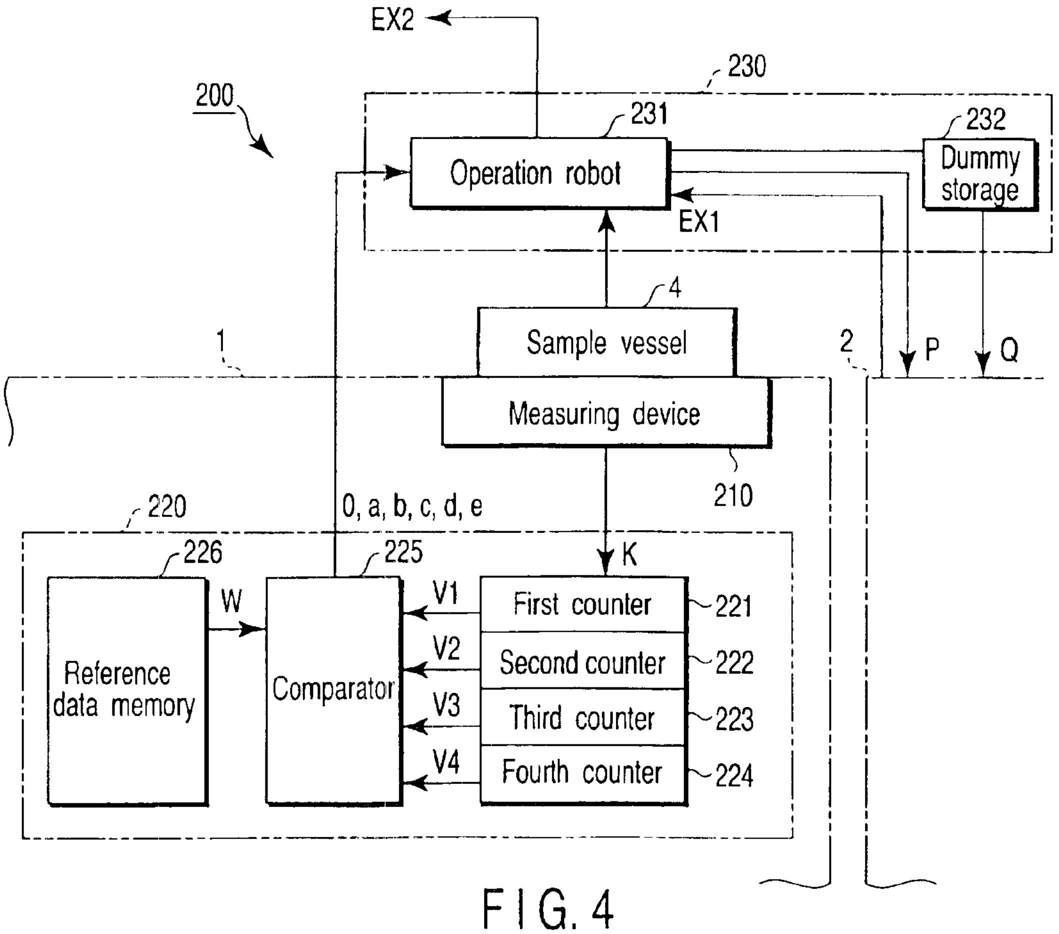
FIG. 4 is a block diagram showing the major portions of the loading-assisting apparatus of the second embodiment.

FIG. 4 is a block diagram showing the major portions of the loading-assisting apparatus 200 of the second embodiment. As shown in FIG. 4, the determination device 220 includes first to fourth counters 221 to 224, a comparator 225 and a reference data memory 226.

The first to fourth counters 221 to 224 add the weights of the sample vessels 3 sequentially loaded in the buckets B of the centrifuge 2 in such a manner that a total weight is obtained for each of the processing groups G of the objects loaded in the buckets B.

The comparator 225 compares measurement data V1, V2, V3 and V4, which represent the total weight of each group of objects to be processed, with reference data W stored in the reference data memory 226. The comparator 225 includes means for generating variation ranking signals 0, a, b, c, d, and e corresponding to the differences between the measurement data and the reference data, and for outputting these signals.

The adjusting/loading device 230 includes an operation robot 231 and a dummy storage 232. The operation robot 231 sequentially loads the sample vessels, the weights of which are measured by the measuring device 210, in the buckets B of the centrifuge 2. In addition, the operation robot 231 operates in accordance with variation ranking signals 0, a, b, c, d and e supplied from the determination device 220. The dummy storage 232 has shapes and dimensions similar to those of a sample vessel 3 and stores a plurality of dummy objects Q whose weights correspond to variations S1 to S4.

When variation ranking signal 0 is received, the operation robot 231 does not make any adjustment to the sample vessel 3 loaded in the centrifuge 2.

Upon receipt of variation ranking signal a, the operation robot 231 takes out a dummy object Q1 whose weight corresponds to variation S1 from the dummy storage 232, and adds it to the processing group G that requires the weight adjustment.

Upon receipt of variation ranking signal b, the operation robot 231 takes out a dummy object Q2 whose weight corresponds to variation S2 from the dummy storage 232, and adds it to the processing group G that requires the weight adjustment.

The operation robot 231 operates in similar manners when variation ranking signals c, and d are supplied thereto. In other words, the operation robot 231 receives variation ranking signals, adds dummy objects Q whose weights correspond to the variation ranking signals to the processing groups G that require weight adjustment.

Upon receipt of variation ranking signal e, the operation robot 231 regards the corresponding processing group G as an abnormal group, i.e., a group whose weight cannot be adjusted. In this case, the operation robot 231 unloads the sample vessels 3 of the abnormal group G from the centrifuge 2 and returns them to their original positions, as indicated by arrows E1 and E2. Simultaneous therewith, the operation robot 231 issues an abnormality notification signal.

(Features of the Embodiments)

[1] A loading-assisting apparatus (100, 200) for use with a centrifuge, according to an embodiment, comprises:

a measuring device (110, 210) configured to measure the weight corresponding to each of the processing groups G loaded in the buckets B of a centrifuge (2);

a determination device (120, 220) configured to determine a variation of the weight of each of the processing groups G with reference to the corresponding reference value, the determination being based on the weight of each of the processing groups G measured by the measuring device; and an adjusting/loading device (130, 230) configured to make predetermined weight adjustment to each of the processing groups G in accordance with the determination the determination device makes, and to subsequently load the processing groups G in the centrifuge (2).

The loading assisting apparatus adjusts the weight balance of the processing groups G when the processing groups G are loaded in the buckets B of the centrifuge (2). Therefore, the centrifuge (2) can rotate smoothly, ensuring reliable centrifugal processing.

[2] A loading-assisting apparatus 100 for use with a centrifuge, according to the embodiment, comprises:

a measuring device 110 configured to measure the weight corresponding to each of processing groups G (i.e., racks 30 that holds sample vessels) before the processing groups G are loaded in the buckets B of a centrifuge 2;

a determination device 120 configured to determine a variation of the weight of each of the processing groups G with reference to the corresponding reference value, the determination being based on the weight of each of the processing groups G (i.e., sample vessel-holding racks 30) measured by the measuring device; and an adjusting/loading device 130 configured to make predetermined weight adjustment to each of the processing groups G (sample vessel-holding racks 30) in accordance with the determination the determination device 120 makes, and to subsequently load the processing groups G in the centrifuge 2.

The loading assisting apparatus described above adjusts the weight balance of the processing groups G (sample vessel-holding racks 30) before the processing groups G are loaded in the centrifuge 2. Therefore, the weight adjustment can be made with comparative ease, and the centrifuge 2 can rotate smoothly, ensuring reliable centrifugal processing.

[3] In the loading-assisting apparatus 100 for use with a centrifuge, as defined in [2] above, the determination device 120 compares measurement data V, which represent the weight of each group of objects to be processed, with reference data W, and generates and outputs variation ranking signals 0, a, b, c, d, and e corresponding to the differences between the measurement data and the reference data.

The loading-assisting apparatus 100 described above is advantageous in that it can effectively cope with the weight imbalance of the processing groups G (racks 30 that hold the sample vessels).

[4] In the loading-assisting apparatus 100 for use with a centrifuge, as defined in [3] above, the adjusting/loading device 130 includes means for adding a dummy object Q to each of the processing groups G (racks 30 that hold sample vessels) in accordance with the variation ranking signals 0, a, b, c, d, and e transmitted from the determination device 120, and then performing a loading operation P with reference to the buckets B of the centrifuge 2.

In the loading-assisting apparatus 100 for use with a centrifuge, the dummy objects Q whose weights are suitable to adjust the weight imbalance of the processing groups G (racks 30 that hold sample vessels) are added to the processing groups G to be processed by the centrifuge 2. Accordingly, the centrifuge 2 can rotate smoothly, thus ensuring reliable centrifugal processing.

[5] A loading-assisting apparatus 200 for use with a centrifuge, according to the embodiment, comprises:

a measuring device 210 configured to individually measure the weights of the objects 3 (i.e., sample vessels 3 to be processed by the centrifuge) before the objects 3 to be processed are loaded in the centrifuge 2;

means for sequentially loading the objects 3 in the buckets B of the centrifuge 2 after the measuring device 210 measures the weights of the objects 3;

counters (221, 222, 223, 224) configured to add the weights of the objects 3 sequentially loaded in the buckets B of the centrifuge 2 in such a manner that a total weight is obtained for each of the groups G of the objects loaded in the buckets B;

a determination device 220 configured to determine a variation of the weight of each of the processing groups G with reference to the corresponding reference value, the determination being based on the weight of each of the processing groups G measured by the measuring device; and an adjusting/loading device 230 configured to make weight adjustment to the groups G already loaded in the buckets B, in accordance with the determination the determination device 220 makes.

The loading-assisting apparatus 200 described above is advantageous in that it can adjust the weight balance of the processing groups G in the buckets even where the sample vessels 3 are loaded in the buckets of the centrifuge sequentially and individually.

[6] In the loading-assisting apparatus 200 for use with a centrifuge, as defined in [5] above, the determination device 220 compares measurement data V1, V2, V3 and V4, which represent the total weight of each group G of objects to be processed, with reference data W, and generates and outputs variation ranking signals 0, a, b, c, d, and e corresponding to the differences between the measurement data and the reference data.

This loading-assisting apparatus 200 produces similar advantages to those of the apparatus described above [3].

[7] In the loading-assisting apparatus 200 for use with a centrifuge, as defined in [6] above, the adjusting/loading device 230 includes means for adding a dummy object Q to each of the processing groups G loaded in the buckets B in accordance with the variation ranking signals 0, a, b, c, d, and e transmitted from the determination device 220.

This loading-assisting apparatus 200 produces similar advantages to those of the apparatus described above [4].

What is claimed is:

1. A loading-assisting apparatus for assisting loading of object processing groups in buckets of a centrifuge, the apparatus comprising:

a measuring device configured to measure a weight of each of the object processing groups;

a detector device communicating with the measuring device and configured to detect a difference between the weight of each of the object processing groups and a reference value; and an adjusting/loading device communicating with the detector device and configured to make predetermined weight adjustments to each of the processing groups in accordance with the difference, the adjusting/loading device subsequently loading the processing groups in the centrifuge.

2. A loading-assisting apparatus for assisting loading of object processing groups in buckets of a centrifuge, the apparatus comprising:

a measuring device configured to measure a weight of each of the object processing groups before the processing groups are loaded in the buckets of the centrifuge;

a detector device communicating with the measuring device and configured to detect a difference between the weight of each of the object processing groups and a reference value; and an adjusting/loading device communicating with the detector device and configured to make predetermined weight adjustments to each of the processing groups in accordance with the difference, the adjusting/loading device subsequently loading the processing groups in the centrifuge.

3. A loading-assisting apparatus according to claim 2, wherein the detector device compares the weight of each of the object processing groups with the reference value, and generates ranking signals corresponding to differences between the weight and the reference value, respectively.

4. A loading-assisting apparatus according to claim 3, wherein the adjusting/loading device includes means for adding a dummy object to each of the processing groups in accordance with the ranking signals transmitted from the detector device, and for subsequently loading the processing groups.

5. A loading-assisting apparatus for assisting loading of objects to be processed in buckets of a centrifuge, the apparatus comprising:

a measuring device configured to individually measure weights of the objects to be processed before the objects are loaded in the centrifuge;

means for sequentially loading the objects in buckets of the centrifuge after the measuring device measures the weights of the objects;

counters configured to add the weights of the objects sequentially loaded in the buckets of the centrifuge such that a total weight is obtained for each group of objects loaded in the buckets;

a detector device communicating with the counters and configured to detect a difference between the weight of each group and a reference value; and an adjusting/loading device communicating with the detector device and configured to make weight adjustments to each of the groups already loaded in the buckets in accordance with the difference.

6. A loading-assisting apparatus for use with a centrifuge, according to claim 5, wherein the detector device compares the weight of each group of objects with the reference value, the detector device generating ranking signals corresponding to differences between the weight and the reference value, respectively.

7. A loading-assisting apparatus according to claim 6, wherein the adjusting/loading device includes means for adding a dummy object to each of the processing groups loaded in the buckets in accordance with the ranking signals transmitted from the detector device.

* * * * *